(12) United States Patent
Baelen

(10) Patent No.: US 7,472,346 B2
(45) Date of Patent: Dec. 30, 2008

(54) MULTIDIMENSIONAL XBRL ENGINE

(75) Inventor: Warren Baelen, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 11/101,727

(22) Filed: Apr. 8, 2005

(65) Prior Publication Data

US 2006/0230025 A1     Oct. 12, 2006

(51) Int. Cl.
*G06F 17/00* (2006.01)

(52) U.S. Cl. .................. 715/234; 715/236; 715/239

(58) Field of Classification Search .................. 715/500, 715/513, 514, 526, 538, 200, 234, 236, 239, 715/273, 267
See application file for complete search history.

(56) References Cited

U.S. PATENT DOCUMENTS

| | | | |
|---|---|---|---|
| 7,155,670 B2 * | 12/2006 | Takizawa et al. | 715/523 |
| 2003/0149935 A1 * | 8/2003 | Takizawa et al. | 715/513 |
| 2003/0172013 A1 * | 9/2003 | Block et al. | 705/33 |
| 2004/0019853 A1 * | 1/2004 | Takizawa et al. | 715/523 |
| 2005/0125318 A1 * | 6/2005 | Jameson | 705/30 |
| 2005/0144096 A1 * | 6/2005 | Caramanna et al. | 705/30 |
| 2005/0150944 A1 * | 7/2005 | Melick et al. | 235/375 |

OTHER PUBLICATIONS

Engel et al., Extensible Business Reporting Language (XBRL) 2.1 Recommendation, published Nov. 14, 2004 on the Internet by XBRL International Specification Working Group, pp. 1, 2, 57 and 74-87.*

Engel et al., Extensible Business Reporting Language (XBRL) 2.1 Recommendation, published Nov. 14, 2004 on the Internet by XBRL International Specification Working Group, pp. 1, 7-8, 14-17, 38-39 and 106.*

Notification of Transmittal of the International Search Report and the Written Opinion of the International Searching Authority, or the Declaration from corresponding PCT Application Serial No. PCT/US2006/011992 mailed Jul. 24, 2006 (9 pages).

* cited by examiner

*Primary Examiner*—Stephen Hong
*Assistant Examiner*—Gregory J Vaughn
(74) *Attorney, Agent, or Firm*—Shumaker & Sieffert, P.A.

(57) ABSTRACT

Various techniques are disclosed for representing extensible business reporting language (XBRL) documents in multidimensional form. For example, a computer-implemented system may include a computer and an XBRL taxonomy document containing extensible markup language (XML) elements. The system further comprises one or more XBRL instance documents each containing XML elements and each conforming to a schema defined by the XBRL taxonomy document, an XBRL engine to parse the XBRL taxonomy document and identify members of a first dimension, and to parse the one or more XBRL instance documents to identify members for each of one or more additional dimensions, wherein each additional dimension corresponds to a respective XBRL instance document. The system may also include a modeling engine to generate a multidimensional model having a plurality of dimensions. Users can view different dimensions and members of a multidimensional XBRL data model as though XBRL data were organized as multidimensional data cubes.

22 Claims, 4 Drawing Sheets

MULTIDIMENSIONAL XBRL ENGINE

TECHNICAL FIELD

The invention relates to software systems and, in particular, enterprise software systems.

BACKGROUND

The extensible business reporting language (XBRL) is a specification for publishing and exchanging financial information of an enterprise. XBRL conforms to the extensible markup language (XML). In essence, XBRL is an electronic data exchange format designed specifically for financial data, such as financial reports, statements, and audit schedules.

XBRL includes an industry-defined taxonomy schema that defines the set of financial accounts to be included in the financial reports or statements. Each financial report or statement is represented as a corresponding XBRL instance document that conforms to an XBRL taxonomy document. In particular, an XBRL taxonomy document defines an XML schema that provides a chart of the financial accounts of the enterprise. Each XBRL instance document for the enterprise conforms to the XBRL taxonomy document and provides specific financial data for one or more of the accounts. XBRL requires that each financial data element of an XBRL instance document be associated with both a unit and a context, such as business entity, time period and segment.

An XBRL engine, also referred to as an XBRL processor, is a software application used to create XBRL taxonomy documents to model the financial accounts of an enterprise. In addition, an XBRL engine processes and validates XBRL instance documents produced by the enterprise. Client software applications, such as reporting tools, interact with the XBRL engine to access the financial data encapsulated in the XBRL instance documents and present the financial data to a user. For example, in response to a request from a client software application, an XBRL engine may import an XBRL instance document and generate an XML or HTML document or other document for use by the client software application.

In general, conventional XBRL engines do not readily allow the financial data to be presented and manipulated in a true multidimensional fashion. More specifically, conventional XBRL engines do not allow the financial data encapsulated within the XBRL documents to be represented as a data cube having multiple dimensions. Moreover, conventional XBRL engines tend to process and represent a single XBRL instance document at a time.

SUMMARY

In general, embodiments of the invention are directed to techniques for representing XBRL data in multidimensional form. Users can manipulate and view different dimensions and members of the XBRL data as if the data where organized as one or more multidimensional data cubes.

In one embodiment, a computer-implemented method comprises parsing an XBRL taxonomy document to identify members of a first dimension, parsing a set of one or more XBRL instance documents that each conform to a schema defined by the XBRL taxonomy document to identify members for each of one or more additional dimensions, wherein each additional dimension corresponds to a respective XBRL instance document, and generating a multidimensional model comprising multiple dimensions that include the first dimension and the one or more additional dimensions, wherein the multidimensional model includes the identified members of the first dimension and the identified members for each of the one or more additional dimensions. The method further comprises extracting financial data from the XBRL instance documents in accordance with the multidimensional model and outputting an electronic report containing the extracted financial data.

In another embodiment, a computer-implemented system comprises a computer, and an XBRL taxonomy document containing extensible markup language (XML) elements. The system further comprises one or more XBRL instance documents each containing XML elements and each conforming to a schema defined by the XBRL taxonomy document, an XBRL engine executing on the computer to parse the XBRL taxonomy document and identify members of a first dimenstion, and to parse the one or more XBRL instance documents to identify members for each of one or more additional dimensions, wherein each additional dimension corresponds to a respective XBRL instance document. The system further comprises a modeling engine executing on the computer to generate a multidimensional model having a plurality of dimensions that include the first dimension and the one or more additional dimensions, wherein the multidimensional model includes the identified members of the first dimension and the identified members for each of the one or more additional dimensions.

In another embodiment, a computer-readable medium contains instructions that cause a programmable processor to parse an XBRL taxonomy document to identify a set of financial accounts, and parse XBRL instance documents to identify entities, periods and segments, wherein each of the XBRL instance documents conforms to a schema defined by the XBRL taxonomy document. The instructions further cause the processor to generate a multidimensional model comprising a first dimension associated with the identified set of financial accounts (the first dimension having members that each correspond to one of the financial accounts), a second dimension associated with the entities (the second dimension having members that each correspond to one of the entities), a third dimension associated with the periods (the third dimension having members that each correspond to one of the periods), and a fourth dimension associated with the segments (the fourth dimension having members that each correspond to one of the segments).

The details of one or more embodiments of the invention are set forth in the accompanying drawings and the description below. Other features, objects, and advantages of the invention will be apparent from the description and drawings, and from the claims.

DETAILED DESCRIPTION

Figure 1:
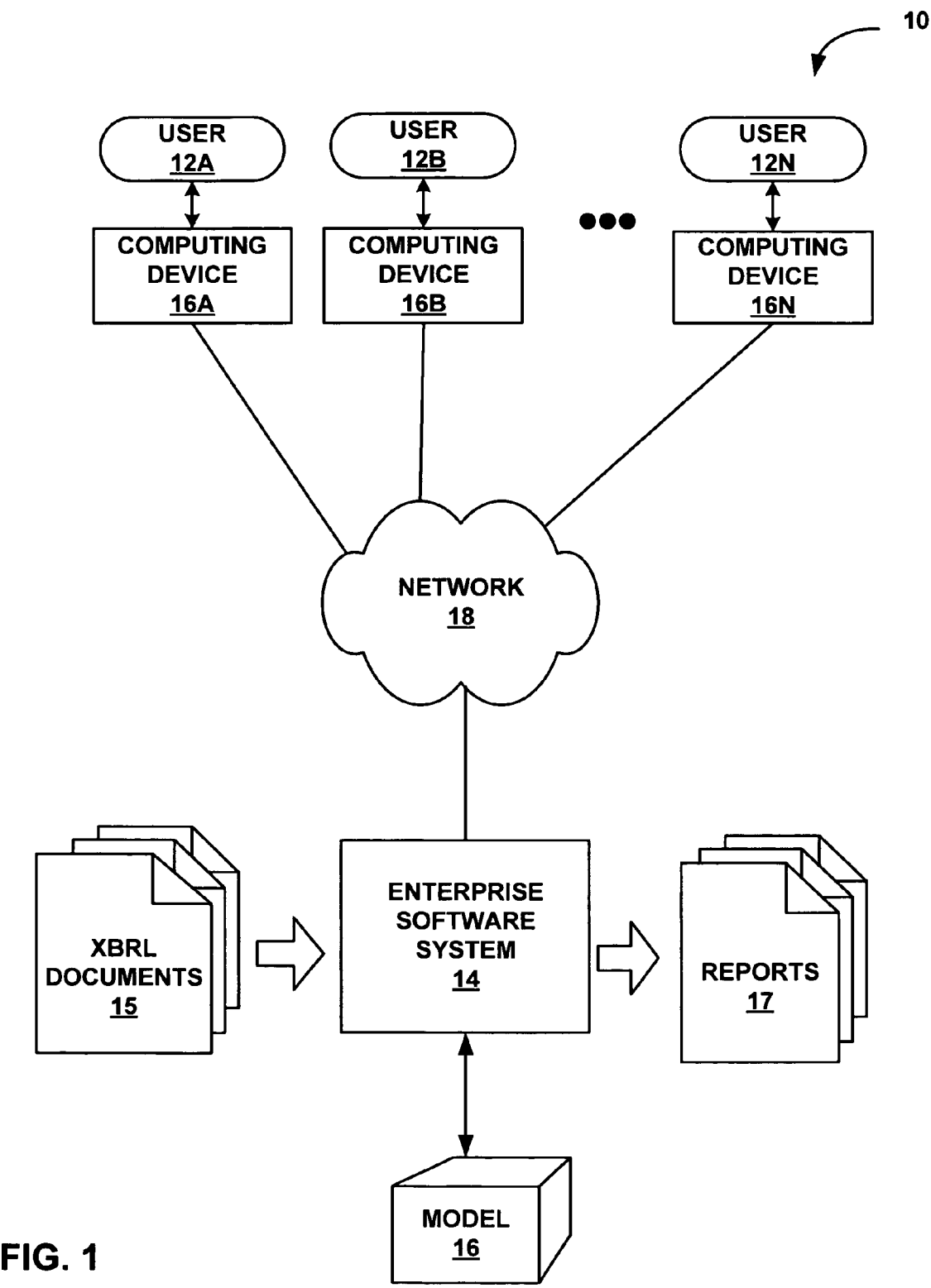
FIG. 1 is a block diagram illustrating an example computing environment in which a plurality of users interact with an enterprise software system.

FIG. 1 is a block diagram illustrating an example computing environment 10 in which a plurality of users 12A-12N

(collectively, "users 12") interact with an enterprise software system 14. In the system shown in FIG. 1, enterprise software system 14 is communicatively coupled to a number of computing devices 16A-16N (collectively, "computing devices 16") by a network 18. Users 12 interact with their respective computing devices 16 to access enterprise software system 14.

Enterprise users 12 may use a variety of computing devices 16 to interact with enterprise software system 14 via network 18. For example, an enterprise user 12 may interact with enterprise software system 14 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like the Internet. In this manner, computing environment 10 can readily scale to suit large enterprises. Enterprise users 12 may directly access enterprise software system 14 via a local area network, or may remotely access enterprise software system 14 via a virtual private network, remote dial-up, or similar remote access communication mechanism.

In general, enterprise systems 19 may be any type of enterprise software system that utilizes XBRL. For example, the techniques described herein may be readily applied to enterprise planning tools, business intelligence tools, reporting tools, order management systems, inventory management systems, sales force management systems, project and resource management systems or other types of enterprise software systems.

In general, enterprise software system 14 processes XBRL documents 15 and dynamically generates a multidimensional data model 16. Multidimensional data model 16 allows users 12 to manipulate and view the XBRL data of XBRL documents 15 as if the XBRL data where organized as one or more multidimensional data cubes. For example, users 12 may interact with enterprise software system 14 and use multidimensional data model 16 to generate reports 17 from XBRL documents 15. As described further, multidimensional data model 16 serves as a framework from which reports 17 may easily be produced from XBRL documents 15. Enterprise software system 14 automatically generates multidimensional data model 16 from XBRL documents 15, including dynamically determining the dimensions and members for the multidimensional data model.

Figure 2:
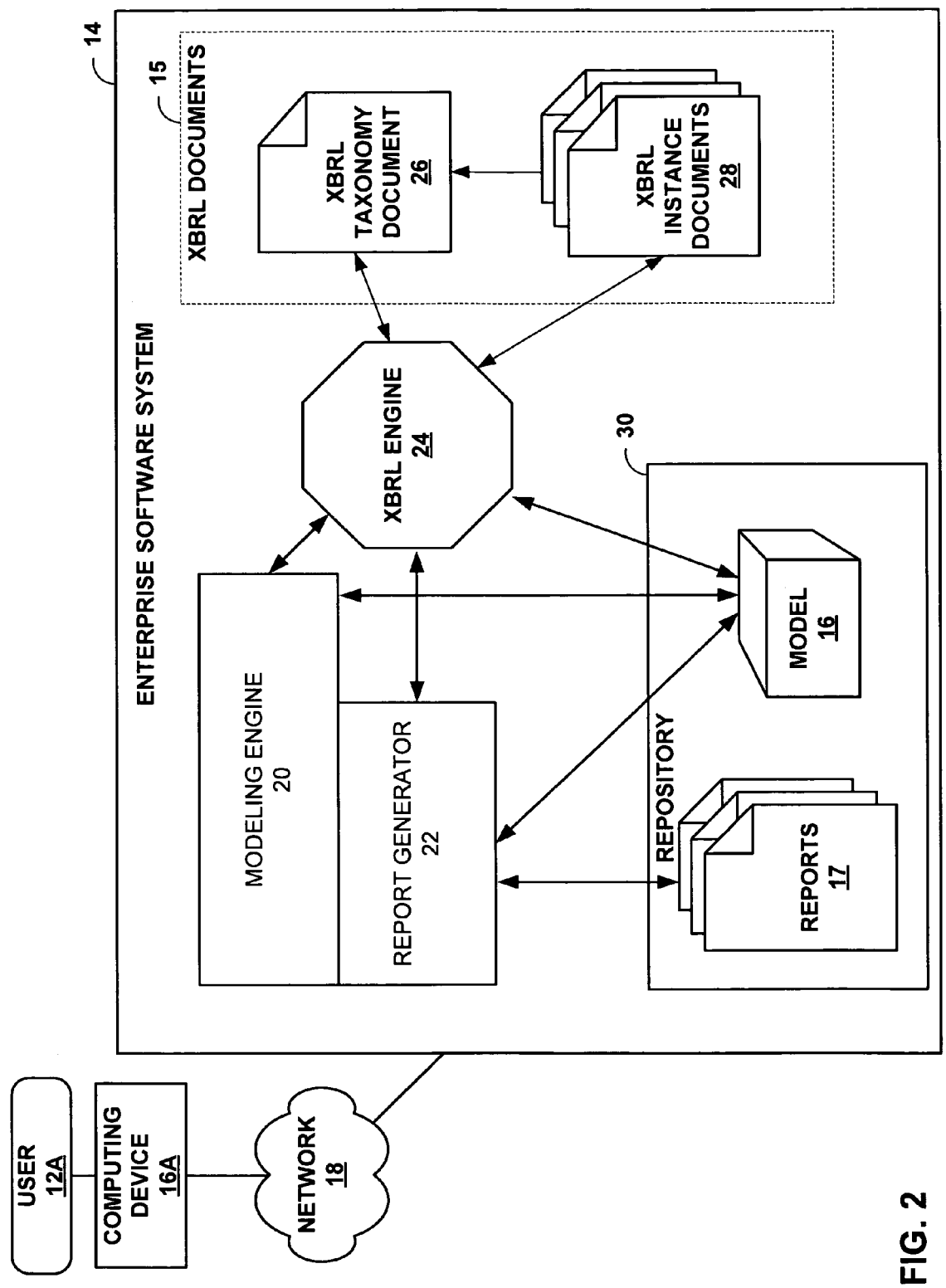
FIG. 2 is a block diagram illustrating an example embodiment of the enterprise software system in further detail.

FIG. 2 is a block diagram illustrating an example embodiment of enterprise software system 14 in further detail. In the illustrated example, enterprise software system 14 includes modeling engine 20, report generator 22, XBRL engine 24 and a repository 30.

In the example of FIG. 2, user 12A interacts with enterprise software system 14 via computing device 16A to create and view reports 17 from XBRL documents 15.

XBRL documents 15 include at least one XBRL taxonomy document 26 and one or more XBRL instance documents 28. XBRL taxonomy document 26 defines an XML schema that represents the financial accounts for the enterprise. Each of XBRL instance documents 28 for the enterprise conforms to XBRL taxonomy document 26 and provides specific financial data for one or more of the accounts. XBRL requires that each financial data element of XBRL instance documents 28 be associated with both a unit and a context, such as business entity, time period and segment.

Initially, user 12A interacts with modeling engine 20 and requests generation of multidimensional data model 16. In particular, modeling engine 20 presents an interface by which user 12A selects XBRL taxonomy document 26 and one or more XBRL instance documents 28. Modeling engine 20 directs XBRL engine 24 to process XBRL taxonomy document 26 and the selected XBRL instance documents 28.

XBRL engine 24 processes XBRL taxonomy document 26 and the selected XBRL instance documents 28 and dynamically generates multidimensional data model 16. In one embodiment, XBRL engine 24 generates model 16 to as a four dimensional data cube. In particular, XBRL engine 24 may define model 16 to have an accounts dimension, an entities dimension, a periods dimension and a segments dimension.

XBRL engine 24 processes XBRL taxonomy document 26 to determine members of a first dimension of a data cube, i.e., the accounts dimension. XBRL engine 24 dynamically determines members for the other dimensions based on XBRL instance documents 28 utilized by the enterprise. For example, XBRL engine 24 may automatically determine members along the entities, periods and segments dimensions based on the XBRL data defined within XBRL instance documents 28. XBRL engine 24 stores multidimensional data model 16 in repository 30 for use by any of users 12.

For example, user 12A may access report generator 22, which is an enterprise software tool for generating reports from multidimensional data cubes. Report generator 22 presents an interface by which user 12A may open multidimensional data model 16 and select particular dimensions of the model as well as specific members along the dimensions:

In addition, user 12A may define any additional calculations to be applied to the modeled data cube. Based on the input, report generator 22 queries XBRL engine 24 for the appropriate XBRL data encapsulated within XBRL instance documents 28. For example, report generator 22 may issue multidimensional queries to XBRL engine 24 to retrieve data for particular members and dimensions of model 16.

Upon receiving a request, XBRL engine 24 translates the multidimensional queries to particular XBRL instance documents 28 and retrieves the appropriate XBRL data. XBRL engine 24 returns the XBRL data to report generator 22 for creation of reports 17.

In this manner, XBRL engine 24 allows multidimensional report generator 22 to present XBRL data as requested by the user as if the XBRL documents 15 where a multidimensional data source. In other words, XBRL engine 24 exposes XBRL documents 15 so that user 12A may interact with modeling engine 20 and report generator 22 to manipulate and view the XBRL data as a multidimensional data cube.

Enterprise software system 14 may include one or more computers having one or more microprocessors or other hardware, firmware and/or software for implementing the techniques described herein. Modeling engine 20, report generator 22 and XBRL engine 24 may be implemented in software and stored on one or more computer-readable media as executable instructions, i.e., program code. For example, the computer-readable medium may comprise magnetic media, optical media, random access memory (RAM), read-only memory (ROM), non-volatile random access memory (NVRAM), electrically erasable programmable read-only memory (EEPROM), flash memory, or other media suitable for storing program code.

Figure 3:
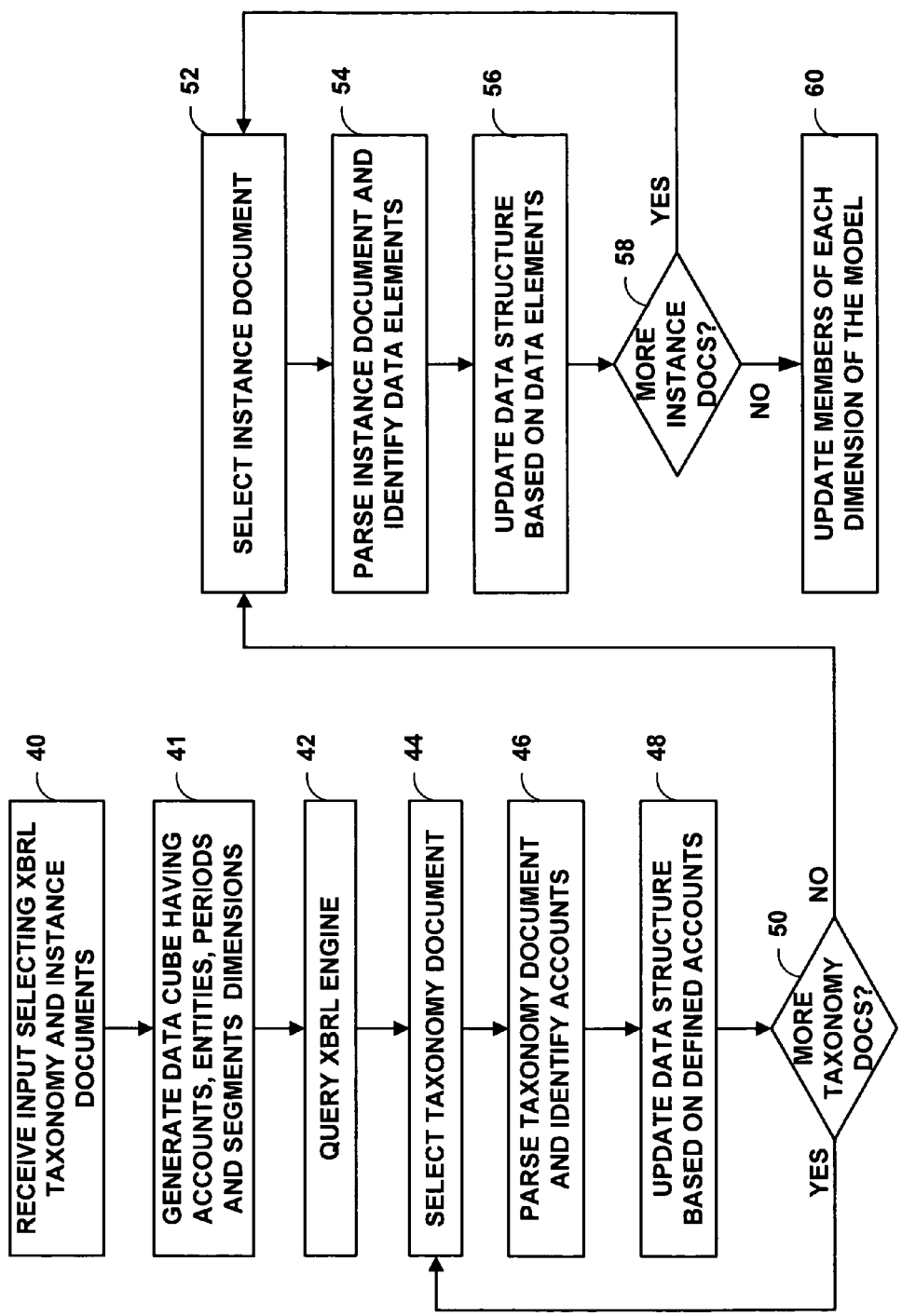
FIG. 3 is a flowchart illustrating an example operation of the enterprise software system when generating a multi-dimensional data model based on XBRL documents.

FIG. 3 is a flowchart illustrating an example operation of enterprise software system 14 when generating multi-dimensional data model 16. Initially, modeling engine 20 presents an interface by which user 12A selects one or more of XBRL taxonomy documents 26 and one or more XBRL instance documents 28 (40).

In addition, modeling engine 20 generates multidimensional data model 16 as an empty data cube. In this example, modeling engine 20 generates model 16 as a data cube having four dimensions, i.e., an accounts dimension, an entities dimension, a periods dimension and a segments dimension (41). Consistent with conventional multidimensional data cubes, each dimension of model 16 may have a hierarchy of members.

Next, modeling engine 20 queries XBRL engine 24 for modeling data describing the members of the each of the dimensions and, in particular, the hierarchical relationship of the members (42). Within the query, modeling engine 20 specifies the particular XBRL taxonomy documents 26 and XBRL instance documents 28 selected by user 12A.

In response, XBRL engine 24 accesses a first one of the XBRL taxonomy documents 26 selected by the user (44). XBRL engine 24 parses the selected XBRL taxonomy document 26 and identifies financial accounts defined within the XBRL taxonomy (46). In particular, XBRL engine 24 parses the XML schema defined by the selected XBRL taxonomy document 26 and identifies the XML elements representing each type of financial account. Moreover, XBRL engine 24 determines the hierarchical relationship of the financial accounts specified by the XBRL schema.

XBRL engine 24 builds a hierarchical data structure that represents the hierarchical relationship of the accounts defined within the selected XBRL taxonomy document (48). XBRL engine 24 repeats this process until all of the XBRL taxonomy documents 26 selected by the user have been processed (50). Thus, after processing all of the selected XBRL taxonomy documents 26, XBRL engine 24 has created a data structure that represents the hierarchical relationship of all of the accounts defined with the selected XBRL taxonomies.

In addition, XBRL engine 24 accesses a first one of the XBRL instance documents 28 selected by the user (52). XBRL engine 24 parses the selected XBRL instance document 28 and identifies data elements defined within the XBRL instance document (54). In particular, XBRL engine 24 identifies any entities, periods or segments XML elements utilized within the XBRL instance document 28. For each of these XML elements, XBRL engine 24 updates the hierarchical data structure to represent the hierarchical relationship of the data elements defined within the selected XBRL instance document (56). XBRL engine 24 repeats this process until all of the XBRL instance documents 28 selected by the user have been processed (58). After processing all of the selected XBRL instance documents 28, XBRL engine 24 has dynamically generated the data structure to represent the hierarchical relationship of the members along the accounts, entities, periods and segments dimensions based on the selected XBRL documents.

XBRL engine 24 communicates the data structure to modeling engine 20 as metadata. Based on the metadata, modeling engine 20 updates model 16 to define the dimensions in accordance with the metadata provided by XBRL engine 24 (60). In particular, modeling engine 20 updates the accounts, entities, periods and segments dimensions to reflect the hierarchical data elements extracted by XBRL engine 24 from the selected XBRL taxonomy documents 26 and XBRL instance documents 28.

For example, for each dimension, XBRL engine 24 may assign a unique identifier to each member specified by the metadata provided by XBRL engine 24. Modeling engine 20 updates each dimension to define the specified members using the unique identifiers, and relates the unique identifiers based on the hierarchical information provided by XBRL engine 24. In this manner, model 16 generally conforms to the organization of multidimensional data cubes, yet may be utilized by XBRL engine 24 as a mapping from the members along each dimension to XBRL data within XBRL instance documents 28. As a result, user 12A may interact with report generator 22 or other multidimensional software applications to consume multi-dimensional data model 16 and present XBRL data as if XBRL documents 15 were a multidimensional data source.

In some embodiment, XBRL engine 24 may dynamically generate multi-dimensional data model 16 to utilize more than four dimensions. For example, XBRL allows the segments to be utilized in an extensible manner. In particular, an enterprise may define additional XML elements within the segments XML elements of XBRL instance documents 28. XBRL engine 24 may automatically identify any additional XML elements used within the segments elements of XBRL instance documents 28. XBRL engine 24 may then represent each of additional types of XML elements as an additional dimension within model 16.

Figure 4:
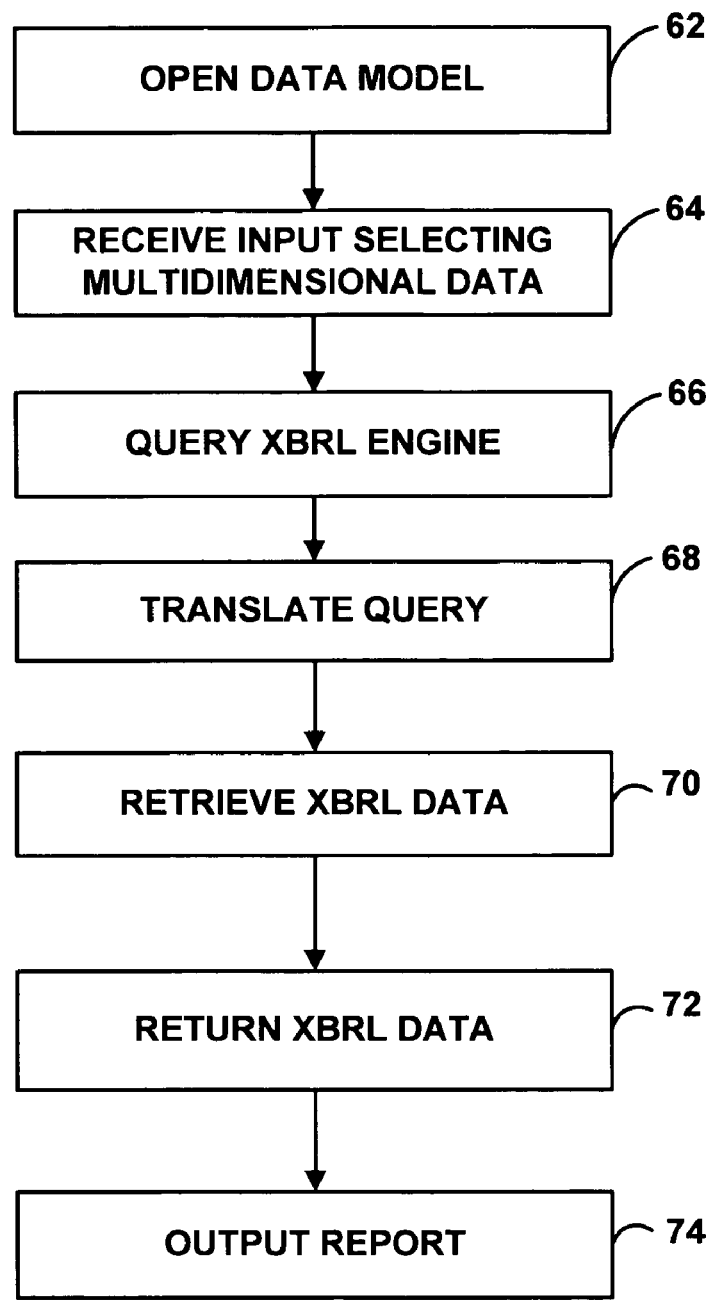
FIG. 4 is a flowchart illustrating an example operation of the enterprise software system when generating a report from the multidimensional data model.

FIG. 4 is a flowchart illustrating an example operation of enterprise software system 14 when generating reports 17 from multidimensional data model 16. Initially, report generator 22 presents an interface by which a user, such as user 12A, opens multidimensional data model 16 (62). Next, report generator 22 receives input specifying particular dimensions of model 16, members along the dimensions, value measures and any other typical criteria for interacting with a multidimensional data cube (64).

Based on the input, report generator 22 issues a query to XBRL engine 24 for the appropriate XBRL data encapsulated within XBRL instance documents 28 (66). For example, report generator 22 may access model 16 and issues a query specifying the uniquely identifiers of the desired four-dimensional data requested by the user. In other words, report generator 22 queries the XBRL engine 24 for multi-dimensional data in accordance with the desired members of the accounts, entities, periods and segments dimensions defined within model 16.

Upon receiving a request, XBRL engine 24 translates the multidimensional queries to one or more of XBRL instance documents 28 that stores the requested XBRL data (68), and retrieves the appropriate XBRL data for the requested members and dimensions of model 16 (70). For example, XBRL engine 24 may retrieve the appropriate XBRL data from one or more of XBRL instance documents 28 based on the requested multidimensional data. Alternatively, XBRL engine 24 may retrieve the XBRL data from a data cache if available.

XBRL engine 24 returns the XBRL data to report generator 22 (72). Upon receiving the multidimensional data, report generator 22 outputs a report 17 (74). For example, report generator 22 may output a report 17 as an XML or HTML document, a spreadsheet or other document for use by a client software application.

For purposes of example, modeling engine 20 and XBRL engine 24 have been described with respect to an embodiment in which model 16 is a multidimensional data cube storing metadata representing the XBRL data stored within XBRL documents 15. In some embodiments, modeling engine 20 generates model 16 to further include the actual XBRL data encapsulated by XBRL documents 15. In these embodiments, report generator 22 need not invoke XBRL engine 24 when generating reports 17.

The following XBRL is an exemplary instance document in abbreviated form. In particular, the following example illustrates a simplified XBRL instance document for an earning release for Alpha Enterprise for the period from Apr. 1, 2005 to Jun. 30, 2005.

```
<?xml version="1.0" encoding="UTF-8" ?>
    <xbrl xmlns="http://www.xbrl.org/2003/instance">
    <xbrll:schemaRef xlink:type="simple">
    <!-- XBRL Data ->
    <usfr-pt:Revenue contextRef="Q2">319102000</usfr-pt:
SalesRevenueNet>
    <usfr-pt:CostGoodsSold  contextRef="Q2">-
207678000</usfr-pt:CostGoodsSold>
    <usfr-pt:OpExpenses  contextRef="Q2">-297944000</
usfr-pt:OpExpenses>
    <usfr-pt:OpProfit contextRef="Q2">21158000</usfr-pt:
OpProfit>
    <usfr-pt:IntExpense  contextRef="Q2">-2758000</usfr-
pt:IntExpense>
    <usfr-pt:EarningsPerShare  contextRef=,"Q2">0.30</
usfr-pt:EarningsPerShare>
    <usfr-pt:CashDividends  contextRef="Q2">0.055</usfr-
pt: CashDividends>
    <!-- Segments -->
    <alpha:SegmentProfit  contextRef="Q2"
unitRef="USD"22 31080000</alpha:SegmentProfit>
    <alpha:SegmentProfitLessDepreciation contextRef="Q2"
unitRef="USD"25052000</alpha:SegmentProfitLessDe-
preciation>
    <!-- Contexts, including entities and periods -->
    <context id="Q2">
    <entity>
        <identifier>Alpha Enterprise</identifier>
    </entity>
    <period>
        <startDate>2005-04-01</startDate>
        <endDate>2005-06-30</endDate>
    </period>
    <scenario>
        <alpha:attestation>unaudited</alpha:attestation>
        <alpha:restated>as restated</alpha:restated>
        <alpha:proforma>proforma</alpha:proforma>
    </scenario>
    </context>
</xbrl>
```

When processing the exemplary XBRL instance document listed above, modeling engine 20 and XBRL engine 24 parse the XBRL and generate model 16 as a four dimensional data cube having an accounts dimension, an entities dimension, a periods dimension and a segments dimension. In this example, modeling engine 20 generates the accounts dimension to include members of: Revenue, CostGoodsSold, OpExpenses, OpProfit, IntExpense, EarningsPerShare, CashDividends. XBRL engine 24 may identify these accounts from the exemplary XBRL instance document listed above or from a corresponding XBRL taxonomy document that defines these and optionally other accounts for Alpha Enterprise. Modeling engine 20 generates the entities dimension to have a single member: Alpha Enterprise. Similarly, modeling engine 20 generates the periods dimension to have a single dimension: Q2. Modeling engine 20 generates the segments dimension to have two members: Profit and Profit-LessDepreciation.

Various embodiments of the invention have been described. These and other embodiments are within the scope of the following claims.

The invention claimed is:

1. A computer-implemented method comprising:
    parsing an extensible business reporting language (XBRL) taxonomy document to identify members of a first dimension;
    parsing a set of one or more XBRL instance documents that each conform to a schema defined by the XBRL taxonomy document to identify members for each of one or more additional dimensions, wherein each additional dimension corresponds to a respective XBRL instance document;
    generating a multidimensional model comprising multiple dimensions that include the first dimension and the one or more additional dimensions, wherein the multidimensional model includes the identified members of the first dimension and the identified members for each of the one or more additional dimensions;
    extracting financial data from the XBRL instance documents in accordance with the multidimensional model; and
    outputting an electronic report containing the extracted financial data.

2. The method of claim 1, wherein generating a multidimensional model comprises generating the multidimensional model to include at least four dimensions.

3. The method of claim 2, wherein the model includes:
    a first dimension having financial accounts as members;
    a second dimension having entities as members;
    a third dimension having periods as members; and
    a fourth dimension having segments as members.

4. The method of claim 1, wherein:
    parsing the set of one or more XBRL instance documents comprises parsing the set of one or more XBRL instance documents to identify elements conforming to an extensible markup language (XML) and identifying the XML elements that specify entities, periods and segments; and
    generating the multidimensional model comprises generating the multidimensional model to include a respective dimension for each of the identified entities, periods and segments.

5. The method of claim 1, wherein:
    parsing the XBRL taxonomy document comprises parsing the XBRL taxonomy document to identify a set of financial accounts as the members of the first dimension; and
    generating the multidimensional model comprises generating the multidimensional model to include the first dimension having the financial accounts as members along the first dimension.

6. The method of claim 1, wherein extracting financial data from the set of one or more XBRL instance documents comprises:
    receiving input from a user, wherein the input selects from the generated multidimensional model at least one dimension of the multiple dimensions and at least one member of the at least one selected dimension;
    generating a multidimensional query based on the input;
    identifying one or more of the set of one or more XBRL instance documents that contain financial data for the at least one member of the at least one selected dimension associated with the multidimensional query; and
    extracting the financial data from the identified XBRL instance documents.

7. The method of claim 1, wherein outputting a report comprises generating an electronic hypertext markup language (HTML) document or an electronic spreadsheet.

8. The method of claim 1, wherein:
parsing the set of one or more XBRL instance documents comprises parsing the set of one or more XBRL instance documents to identify one or more elements;
parsing the XBRL taxonomy document comprises parsing the XBRL taxonomy document to identify one or more financial accounts as the members of the first dimension; and
generating the multidimensional model, the multidimensional model including the first dimension having the identified financial accounts as members, and the multidimensional model further including a respective dimension for each identified element.

9. A computer-readable medium comprising instructions for causing a programmable processor to:
parse an extensible business reporting language (XBRL) taxonomy document to identify a set of financial accounts;
parse XBRL instance documents to identify entities, periods and segments, wherein each of the XBRL instance documents conforms to a schema defined by the XBRL taxonomy document; and
generate a multidimensional model comprising:
a first dimension associated with the identified set of financial accounts, the first dimension having members that each correspond to one of the financial accounts;
a second dimension associated with the entities, the second dimension having members that each correspond to one of the entities;
a third dimension associated with the periods, the third dimension having members that each correspond to one of the periods; and
a fourth dimension associated with the segments, the fourth dimension having members that each correspond to one of the segments.

10. The computer-readable medium of claim 9, further comprising additional instructions to cause the processor to:
extract financial data from the XBRL instance documents in accordance with one or more user-selected criteria applied to the generated multidimensional model, wherein the one or more user-selected criteria specifies at least one dimension and at least one member of the at least one specified dimension in the multidimensional model; and
output an electronic report containing the extracted financial data.

11. A computer-implemented system comprising:
a computer;
an extensible business reporting language (XBRL) taxonomy document containing extensible markup language (XML) elements;
one or more XBRL instance documents each containing XML elements and each conforming to a schema defined by the XBRL taxonomy document;
an XBRL engine executing on the computer to parse the XBRL taxonomy document and identify members of a first dimension, and to parse the one or more XBRL instance documents to identify members for each of one or more additional dimensions, wherein each additional dimension corresponds to a respective XBRL instance document; and
a modeling engine executing on the computer to generate a multidimensional model having a plurality of dimensions that includes the first dimension and the one or more additional dimensions, wherein the multidimensional model includes the identified members of the first dimension and the identified members for each of the one or more additional dimensions.

12. The system of claim 11, wherein the multidimensional model has at least four dimensions.

13. The system of claim 11, wherein the model comprises:
a first dimension having financial accounts as members;
a second dimension having entities as members;
a third dimension having periods as members; and
a fourth dimension having segments as members.

14. The system of claim 11,
wherein the one or more XBRL instance documents each contain XML elements that encapsulate financial data,
wherein the XBRL engine parses the one or more XBRL instance documents to identify XML elements that specify entities, periods and segments, and
wherein the modeling engine generates the multidimensional model to include dimensions having members that correspond to the identified entities, periods and segments.

15. The system of claim 11,
wherein the XBRL taxonomy document contains XML elements that define financial accounts for an enterprise,
wherein the XBRL engine parses the XBRL taxonomy document to identify the financial accounts as the members of the first dimension, and
wherein the modeling engine generates the multidimensional model to include the first dimension having members that correspond to the financial accounts.

16. The system of claim 11, further comprising a report generator to output an electronic report containing financial data in accordance with the multidimensional model.

17. The system of claim 16,
wherein the one or more XBRL instance documents each contain XML elements that encapsulate the financial data, and
wherein the XBRL engine parses the one or more XBRL instance documents to extract the financial data.

18. The system of claim 16, wherein the electronic report comprises an electronic hypertext markup language (HTML) document or an electronic spreadsheet.

19. The system of claim 11, wherein the XBRL engine is further configured to extract financial data from the at least one XBRL instance document in accordance with one or more user-selected criteria applied to the multidimensional model, wherein the one or more user-selected criteria specifies at least one dimension and at least one member of the at least one specified dimension in the multidimensional model, and wherein the system further comprises a report generator to output an electronic report containing the extracted financial data.

20. A computer-readable medium comprising instructions for causing a programmable processor to:
parse an extensible business reporting language (XBRL) taxonomy document to identify members of a first dimension;
parse a set of one or more XBRL instance documents that each conform to a schema defined by the XBRL taxonomy document to identify members for each of one or more additional dimensions, wherein each additional dimension corresponds to a respective XBRL instance document;
generate a multidimensional model comprising multiple dimensions that include the first dimension and the one or more additional dimensions, wherein the multidimensional model includes the identified members of the first dimension and the identified members for each of the one or more additional dimensions;

extract financial data from the XBRL instance documents in accordance with the multidimensional model; and output an electronic report containing the extracted financial data.

21. A computer-readable medium comprising instructions for causing a programmable processor to:

parse an extensible business reporting language (XBRL) taxonomy document to identify a set of financial accounts as members of a first dimension;

parse an XBRL instance document to identify one or more elements as members of a second dimension, wherein the XBRL instance document conforms to a schema defined by the XBRL taxonomy document; and generate a multidimensional model that includes the first dimension having the identified financial accounts as members, and the multidimensional model further including a the second dimension having the one or more identified elements as members.

22. The computer-readable medium of claim 21, further comprising additional instructions for causing the processor to:

extract financial data from the XBRL instance document in accordance with one or more user-selected criteria applied to the generated multidimensional model, wherein the one or more user-selected criteria specifies at least one dimension and at least one member of the at least one specified dimension in the multidimensional model; and output an electronic report containing the extracted financial data.

* * * * *